(12) United States Patent
Bandic et al.

(10) Patent No.: US 7,119,980 B2
(45) Date of Patent: Oct. 10, 2006

(54) SYSTEM AND METHOD FOR WRITING SECURE DATA TO DISK

(75) Inventors: Zvonimir Z. Bandic, San Jose, CA (US); Martin Chen, San Jose, CA (US); Fu-Ying Huang, San Jose, CA (US); Bruce Alexander Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/951,554

(22) Filed: Sep. 27, 2004

(65) Prior Publication Data

US 2006/0066979 A1   Mar. 30, 2006

(51) Int. Cl.
*G11B 21/02* (2006.01)
(52) U.S. Cl. .............................. 360/75; 360/60; 360/71
(58) Field of Classification Search ................... None
See application file for complete search history.

(56) References Cited

U.S. PATENT DOCUMENTS

| | | | | |
|---|---|---|---|---|
| 3,686,649 A * | 8/1972 | Behr | ........................ | 360/77.07 |
| 3,959,631 A * | 5/1976 | Otten | ......................... | 235/493 |
| 4,074,328 A * | 2/1978 | Hardwick | ................. | 360/77.06 |
| 4,120,629 A * | 10/1978 | Christian et al. | ....... | 198/341.02 |
| 4,314,290 A * | 2/1982 | Ragle | ....................... | 360/77.06 |
| 4,346,413 A * | 8/1982 | Hack | ........................ | 360/77.07 |
| 4,589,037 A * | 5/1986 | Jen et al. | ................. | 360/77.04 |
| 4,785,361 A * | 11/1988 | Brotby | ......................... | 360/60 |
| 4,866,769 A * | 9/1989 | Karp | ............................ | 705/56 |
| 4,906,988 A * | 3/1990 | Copella | ...................... | 340/5.86 |
| 4,910,625 A * | 3/1990 | Albrecht et al. | ............ | 360/135 |
| 5,027,396 A * | 6/1991 | Platteter et al. | ............. | 713/185 |
| 5,241,442 A * | 8/1993 | Akashi | ........................ | 360/135 |
| 5,301,072 A * | 4/1994 | Wilson | ..................... | 360/77.01 |
| 5,392,351 A * | 2/1995 | Hasebe et al. | ................. | 705/51 |
| 5,555,304 A * | 9/1996 | Hasebe et al. | ................. | 705/51 |
| 5,661,800 A * | 8/1997 | Nakashima et al. | .......... | 726/27 |
| 5,754,649 A * | 5/1998 | Ryan et al. | .................. | 380/203 |
| 5,757,749 A * | 5/1998 | Misawa | ....................... | 711/164 |
| 6,366,419 B1 * | 4/2002 | Gaub et al. | .................... | 360/48 |
| 6,411,459 B1 * | 6/2002 | Belser et al. | .................. | 360/75 |
| 6,433,948 B1 * | 8/2002 | Lee | ............................... | 360/75 |
| 6,542,325 B1 * | 4/2003 | Molstad et al. | ........... | 360/77.12 |
| 6,691,226 B1 * | 2/2004 | Frank et al. | ................. | 713/100 |
| 6,754,016 B1 * | 6/2004 | Messner et al. | .............. | 360/48 |
| 6,788,800 B1 * | 9/2004 | Carr et al. | ................... | 382/100 |
| 6,879,457 B1 * | 4/2005 | Eaton et al. | ................... | 360/75 |
| 6,885,513 B1 * | 4/2005 | Baker | .......................... | 360/17 |
| 6,898,038 B1 * | 5/2005 | Fennema et al. | ............. | 360/60 |

OTHER PUBLICATIONS

Wikipedia, en.wikipedia.org/wiki/Digital_signal_processor.*

* cited by examiner

*Primary Examiner*—Kin Wong
(74) *Attorney, Agent, or Firm*—John L. Rogitz

(57) ABSTRACT

Secure data is written to a disk during manufacture in such a way that it can be read but not copied. Methods include writing triangular transitions or very slow transitions from positive magnetic to negative magnetic and then erasing the negative parts to yield a code that consists of positive read back amplitudes only. Or, high frequency transitions can be written during servo writing.

5 Claims, 5 Drawing Sheets logic for triangular magnetization transitions and very low transitions from positive to negative logic for high frequency transitions

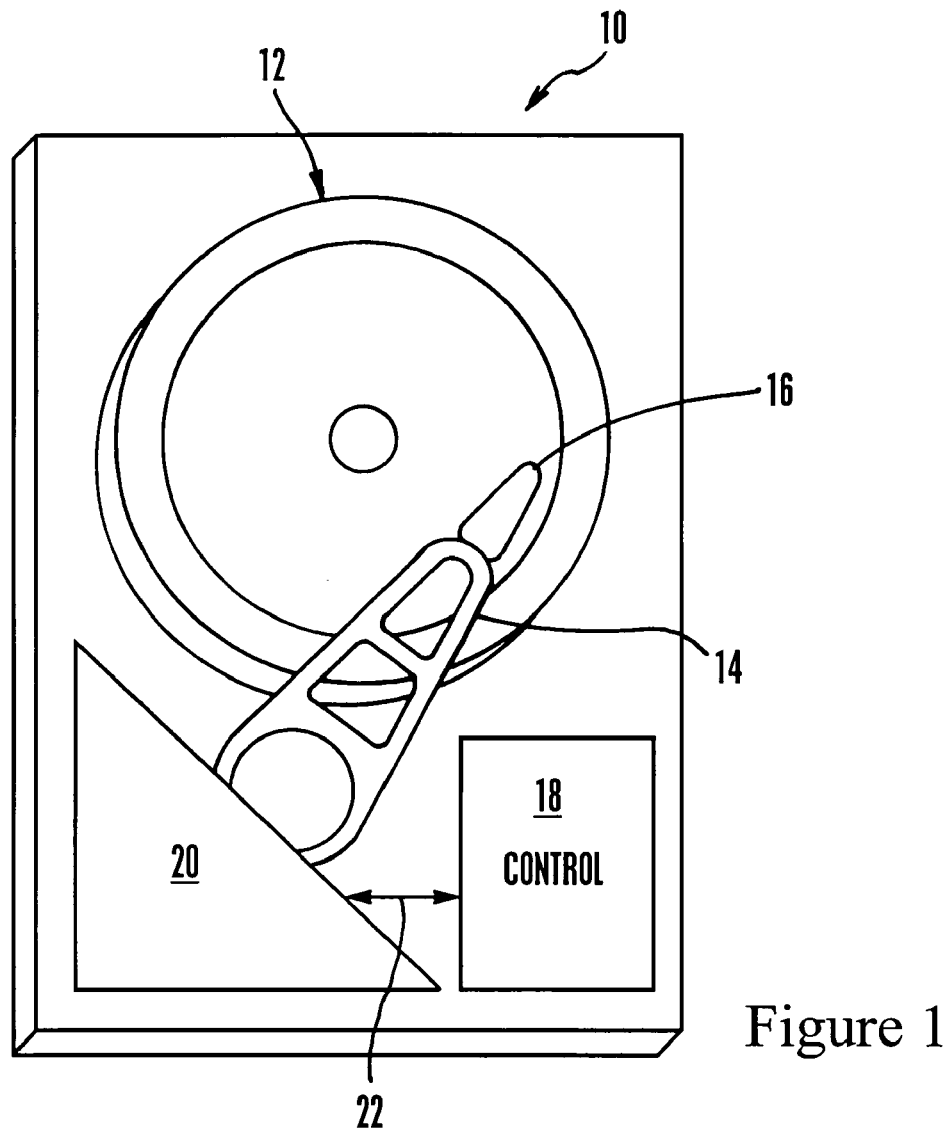
Figure 1
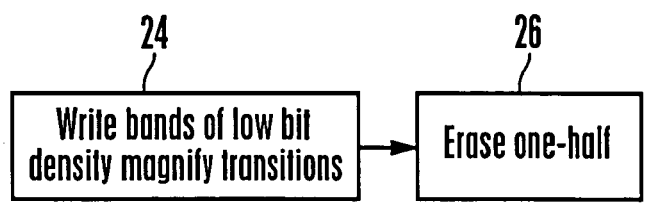
Figure 2
logic for triangular magnetization transitions and very low transitions from positive to negative
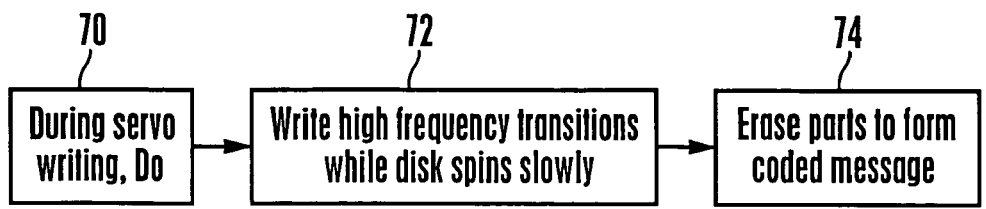
Figure 11  logic for high frequency transitions

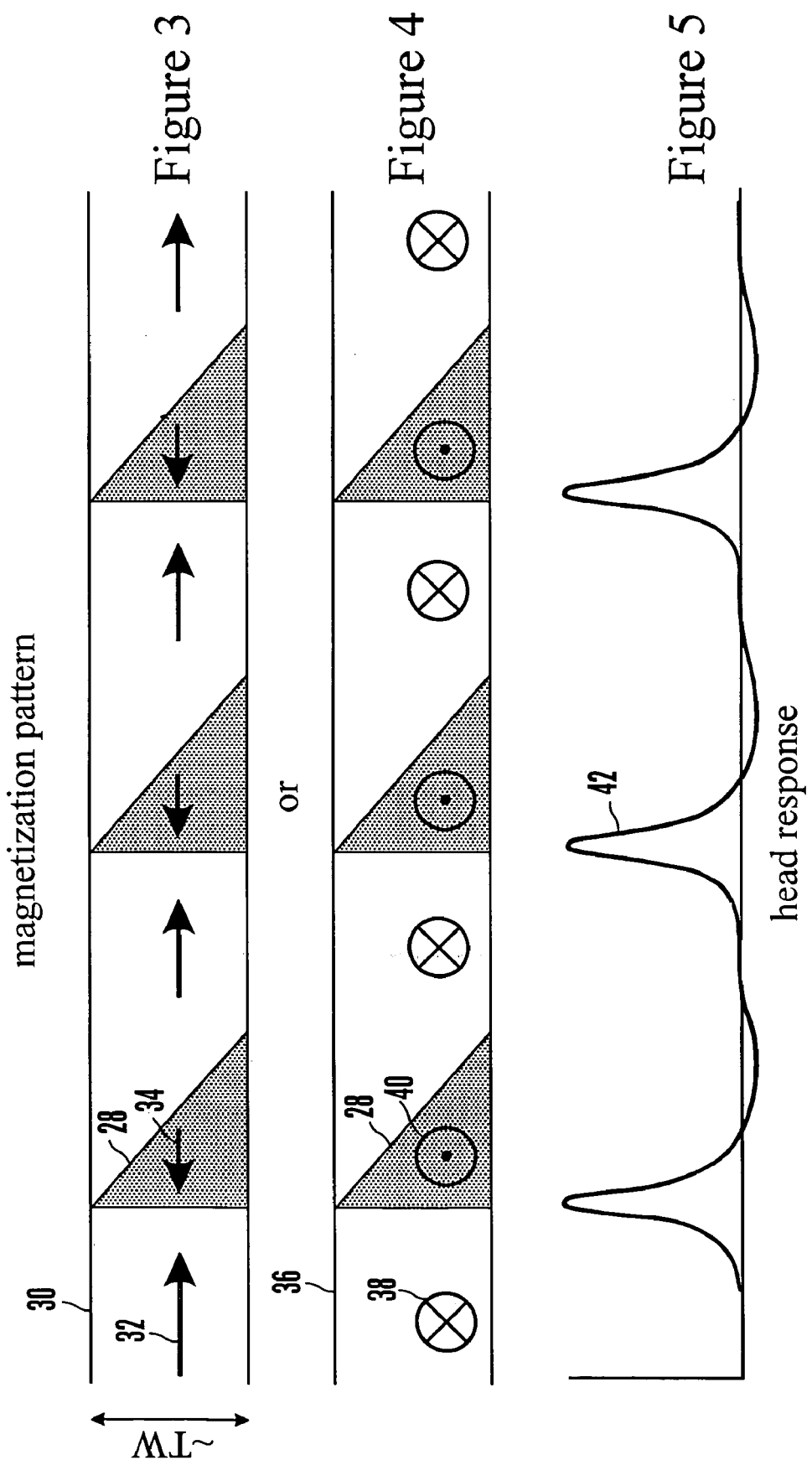

SYSTEM AND METHOD FOR WRITING SECURE DATA TO DISK

FIELD OF THE INVENTION

The present invention relates generally to hard disk drives.

BACKGROUND OF THE INVENTION

Sensitive data such as keys for operating systems and programs, passwords, and the like can be written to a hard disk drive for subsequent access to, e.g., programs and data on the HDD. The present invention critically recognizes that it is important that once written, secure data should be rendered difficult to copy or modify. Otherwise, a hacker might, e.g., modify a password that he cannot read into one that he can, and then use the modified password to access data that is supposed to be protected. Or, the hacker might copy secure data to another device for later decoding of the data at a convenient time and place. With this recognition in mind, the invention below provides tamper-resistant data.

SUMMARY OF THE INVENTION

A method for writing secure data onto a magnetic recording disk is disclosed which includes writing the secure data in a way that renders infeasible copying or altering the secure data. Thus, if the data is a serial number, even if a hacker might be able to read the serial number the hacker cannot feasibly alter it or create a clone with the same serial number.

Stated differently, data, once written, cannot feasibly be changed, enabling many important applications. The difficulty in copying data provided for in some embodiments of the present invention relies upon the notion that each item of information is stored in a specific location as illustrated below. For example, as mentioned above, the serial number of, e.g., the hard disk drive itself may be stored in accordance with present principles, e.g., during manufacture the serial number is written in a fixed location on the HDD which consequently may never be blank. The HDD cannot feasibly be cloned by copying the serial number to another HDD because the serial number on the other HDD would be alterable, i.e., it could not be overwritten successfully.

In other exemplary non-limiting applications, large documents and other collections of data can be efficiently rendered tamper proof by computing a cryptographic hash of the document and storing the hash only in the tamper-proof storage area, rendering the system more efficient because the tamper-proof storage area can have a low density of information.

Yet again, a HDD irrevocably can be associated with a host (for example a consumer electronics set-top box) by combining the serial number of the HDD and the serial number of the host using a one-way function (e.g., a cryptographic hash). The result of the one-way function then may be stored in a fixed location in the tamper-proof storage area. In the language of "Trusted Computing" the tamper-proof storage area can be thought of as providing a mechanism for storing "measurements" in an immutable fashion.

In specific embodiments, during the manufacturing process a pattern is written that cannot be written by a normal user because it has an unusual shape such as triangular transitions or because it is written at a frequency higher than the normal operating frequency of the disk. Thus, the pattern, when read, has either strong positive peaks and low-amplitude negative peaks, or it has a higher than usual frequency that, while being readable, is not writable using normal operating write circuitry. Then, in accordance with any appropriate code, parts (e.g., one half, but not greater portions can be erased) of this pattern are erased to create an encoded message. Accordingly, the code cannot be created or modified by a normal user or hacker.

In some implementations, triangular-shaped features are written, with approximately one half of the features being erased to establish a binary code representing the secure data. The features may be symmetric or asymmetric across a data track onto which the features are written. Or, transitions may be written that slowly transition from positive to negative, with approximately one-half of the transitions being erased to establish a final pattern. Yet again, the method can include writing high frequency transitions during servo writing when the disk rotates at a speed less than the speed at which the disk rotates during normal read and write operations, such that when the disk rotates during normal read and write operations, the transitions cannot be duplicated using a write head associated with the disk.

In another aspect, a disk is pre-formatted with at least one pattern representing a code. The pattern can be written by a magnetic printing process, a specially modified servo writing process, or by use of a write head that is not used in a drive subsequently provided with the disk. The pattern is established by erasing a fixed number of transition periods in a sequence of transitions. In a preferred embodiment exactly one half of the transitions may be erased. If the pattern is subsequently altered by erasing more transitions this tampering can be easily detected. in essence, the various methods may write an initial pattern that cannot be generated by a subsequent ordinary user. The initial pattern is modified by partial erasure to form a unique pattern that cannot feasibly be modified or copied.

In yet another aspect, a disk is pre-formatted with at least one pattern representing a code. The pattern is established by writing high frequency transitions during servo writing when the disk rotates at a speed less than the speed at which the disk rotates during normal read and write operations, such that when the disk rotates during normal read and write operations, the pattern cannot be altered using a write head associated with the disk, because the pattern can consist of frequencies that are above normal drive operation frequencies (yet are still readable).

In still another aspect, a read channel chip that is configured to read secure data includes a variable gain amplifier (VGA) and at least one matched filter receiving input from the VGA. The filter is trained for each head and each track zone of a secure data region of a hard disk drive being read. A threshold detector receives input from the matched filter and outputs only positive pulses in response to signal peaks above a threshold.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of an exemplary embodiment of the present storage device, configured as a hard disk drive, with portions of the housing broken away;

FIG. 2 is a flow chart of the general logic for writing secure date using triangular features or very slow transitions from positive to negative;

FIG. 3 is a schematic view of a disk track showing triangular features for longitudinal recording;

FIG. 4 is a schematic view of a disk track showing triangular features for perpendicular recording;

FIG. 5 is a schematic diagram of the read head response to the features shown in FIGS. 3 and 4;

FIG. 11 is a flow chart of the general logic for writing secure date using high frequency transitions.

DETAILED DESCRIPTION

Figure 6:
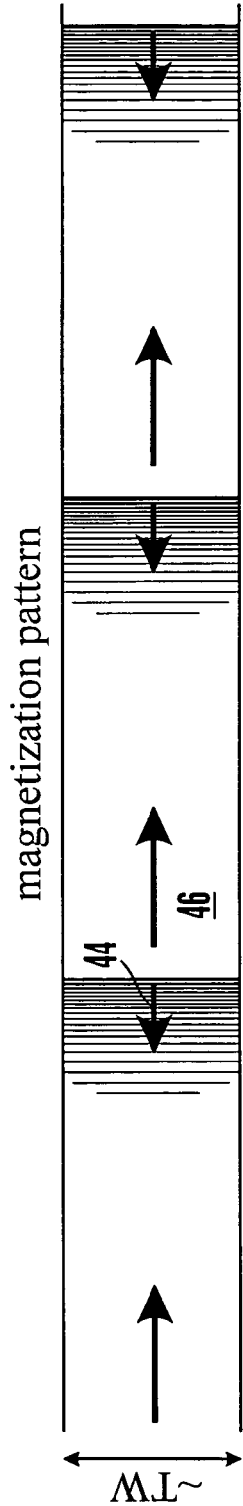
FIG. 6 is a schematic view of a disk track showing transitions for longitudinal recording when slow transitions are made from positive to negative magnetization.
Figure 7:
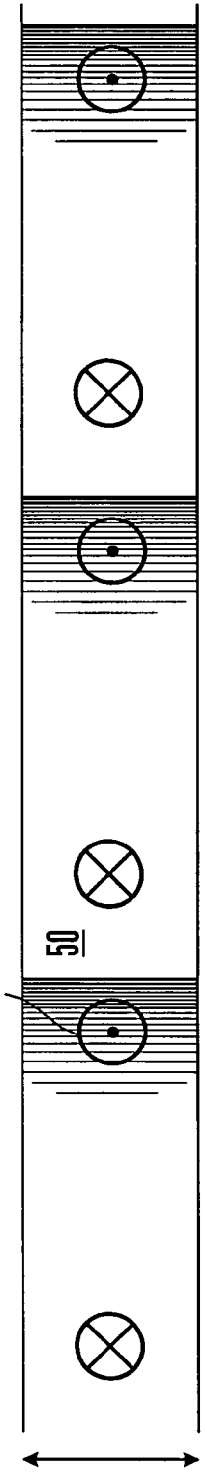
FIG. 7 is a schematic view of a disk track showing transitions for perpendicular recording when slow transitions are made from positive to negative magnetization.

Referring initially to FIG. 1, a device is shown, generally designated 10, for writing secure data such as keys for operating systems and programs, passwords, and other sensitive information onto a storage medium 12 in such a way that the secure data cannot be copied or altered. In one embodiment the storage medium 12 may be implemented by plural storage disks in a hard disk drive (HDD). When implemented as a hard disk drive, the device 10 includes an arm 14 having a read/write head 16 (part of what is colloquially referred to as a "slider") on the end thereof in accordance with hard disk drive principles. The data storage region 12 may be managed by a controller 18 that can be a conventional hard disk drive controller. The controller 18 controls an electromechanical actuator 20 by sending signals over a path 22 in accordance with principles known in the art to read data from and to write data to the disks 12.

According to an aspect of the present invention, secure data protection is achieved by writing several bands of low-bit density magnetization transitions which, when read back, produce signals of low negative amplitude but high positive amplitude. As set forth further below, writing of protected data is achieved by partially erasing parts (e.g., approximately one-half) of the written signal during the secure data writing process. With this invention, once the data is written, it cannot be copied or modified (apart from erasure), because the read head response is unusual in that it consists of partial pulses only. Accordingly, when the operating system associated with the HDD attempts software key verification or password confirmation, it reads and decodes the secure data from the securely-written band as set forth further below.

FIG. 2 shows the general logic that can be followed when partial erasure is to be effected. Commencing at block 24, multiple HDD bands are written with low bit density magnetic transitions or features defining a desired code representative of secure data, using one of the methods shown below in FIGS. 3–9. At block 26 exactly one-half of the transitions may be erased in accordance with a code, a non-limiting example of which is described further below, to establish a coded message. Because the secure data is written at low frequency, precise timing can be established for DC erasing of the negative parts of the band(s). Because the resulting transitions or features are unique and have unusual read head response that consists of positive pulses only, the data can be read but not copied.

FIGS. 3–5 illustrate that one way the logic of block 24 of FIG. 2 can be accomplished is by writing triangular magnetization features 28, which are an example of an unusual pattern in that they are different from transitions that are written by the normal write circuitry during user operation. The triangular features 28 may be made by careful microtrack-to-microtrack writing, or by magnetic printing (for both longitudinal and perpendicular recording), or, for perpendicular media, by using a special write head that has a triangular footprint. FIG. 3 shows triangular features 28 along a longitudinally-written track 30 having track width "TW", with left and right arrows 32, 34 respectively representing magnetization directions along the track. As shown, after the logic of FIG. 2, negative transitions in the read signal have very low amplitude. FIG. 4 on the other hand shows triangular features 28 along a perpendicularly-written track 36, with down and up symbols 38, 40 respectively representing magnetic field lines into and out of the page. As shown in FIG. 5, negative transitions in the read back signal have very low amplitude, such that the read head response consists substantially only of positive-pulses 42.

It is to be understood that the present triangular features may be symmetric across the track 30, or asymmetric. In the latter case, the secure data would be read several times, moving across the track, to compare the amplitude of the read back signal each time to an expected amplitude. For asymmetric features, a feature produces different read back pulses depending on what part of the track the head is positioned over. If such differences between several passes are not detected, a false return may be indicated, meaning that the code being read, since the read back signal does not indicate the expected asymmetry, may have been written by a hacker. In such a case the secure data is presumed to have been compromised and thus is not used.

Left and right pointing triangles can also be used. This provides the benefit that as the head moves across the track, the amplitude of each peak changes but the average amplitude remains the same, which can be particularly beneficial when the head is not stable.

Figure 8:
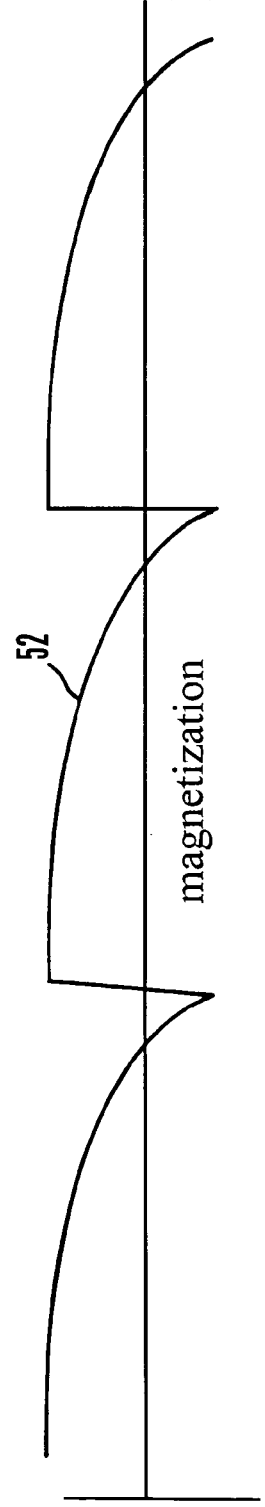
FIG. 8 is a schematic diagram of the write current used for writing the transitions shown in FIGS. 6 and 7.
Figure 9:
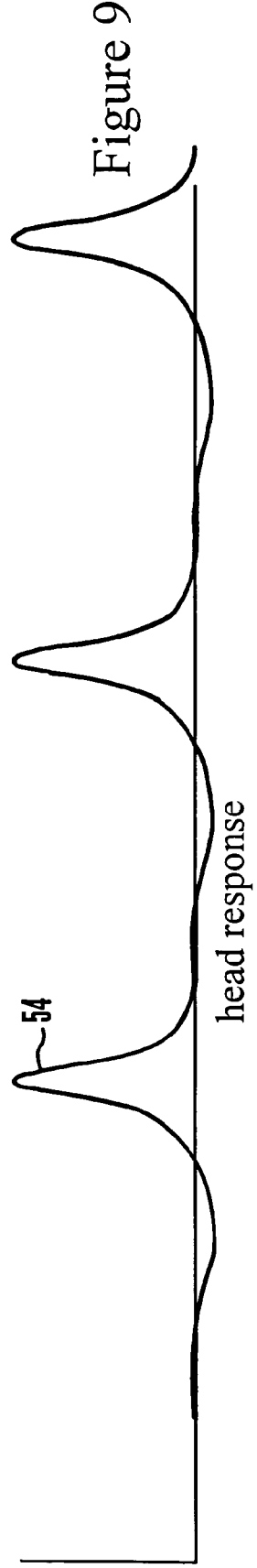
FIG. 9 is a schematic diagram of the read head response to the transitions shown in FIGS. 6 and 7.

FIGS. 6–9 illustrate how the writing process shown in block 24 of FIG. 2 may alternatively be accomplished. In FIGS. 6–9, very slow transitions from positive magnetization to negative magnetization produce a read back signal with strong positive peaks and low-amplitude negative peaks, with left/right arrows and up/down symbols having the same meaning as they did in FIGS. 3 and 4. The write current profile 52 that is used to achieve these patterns is shown in FIG. 8, while FIG. 9 shows the signal, consisting substantially only of positive pulses 54, that is generated by the read head when the magnetic pulses are read.

Figure 10:
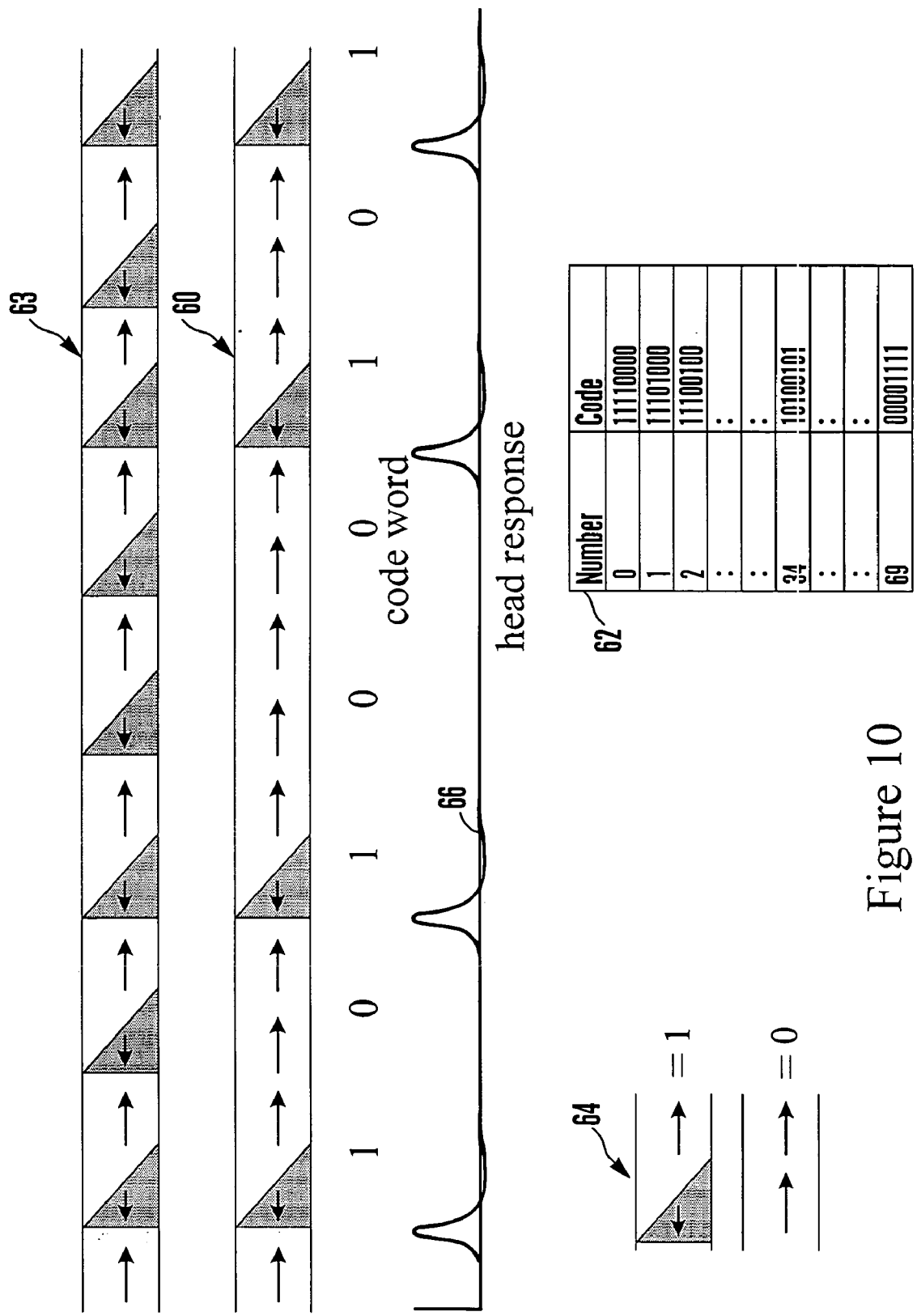
FIG. 10 illustrates the magnetic transitions and head response for coding the number "34", along with an exemplary non-limiting coding table.

FIG. 10 shows, for illustration purposes, pulse coding 60 that can be used at block 26 of FIG. 2 to encode the binary representation for the numeral "34", along with an exemplary non-limiting codebook table 62 correlating numbers to binary representations. In the exemplary non-limiting illustration of FIG. 10, a band of eight periods of transitions (either triangular as shown or slow positive-to-negative) is used as indicated at 63, with four periods being DC-erased as indicated at 60 such that seventy different combinations are available for coding.

As indicated at 64, no magnetic transitions indicates a binary "zero", and a single triangular transition indicates a binary "one". The read head signal consisting of positive pulses only indicating "ones" (in addition to substantially low amplitude indicating "zeroes") is indicated at 66. The operating system first decodes the read head signal to determine the value of the secure data, and then can execute password confirmation or key verification algorithms on the decoded data to permit (or not) the requested access.

FIG. 11 shows that in an alternate implementation, at block 70 during servo writing, when the disk rotates at a speed that less than the speed at which it rotates during normal read/write operations, a process is entered at block 72. At block 72, high frequency magnetic transitions (i.e., higher than could be written at normal rotational speeds) are written to the disk. This is made easier because during servo writing the disk is spinning relatively slowly. The high frequency transitions are thus almost impossible to reproduce (but not to read) during normal drive operation. At block 74, parts of the pattern are erased in accordance with a code to establish the encoded message.

The secure data written in accordance with above principles subsequently can be read when required by the operating system associated with the HDD using either a peak detection process that detects positive pulses and prohibits negative pulses, or by using separate matched filters to read the secure data bands.

Figure 12:
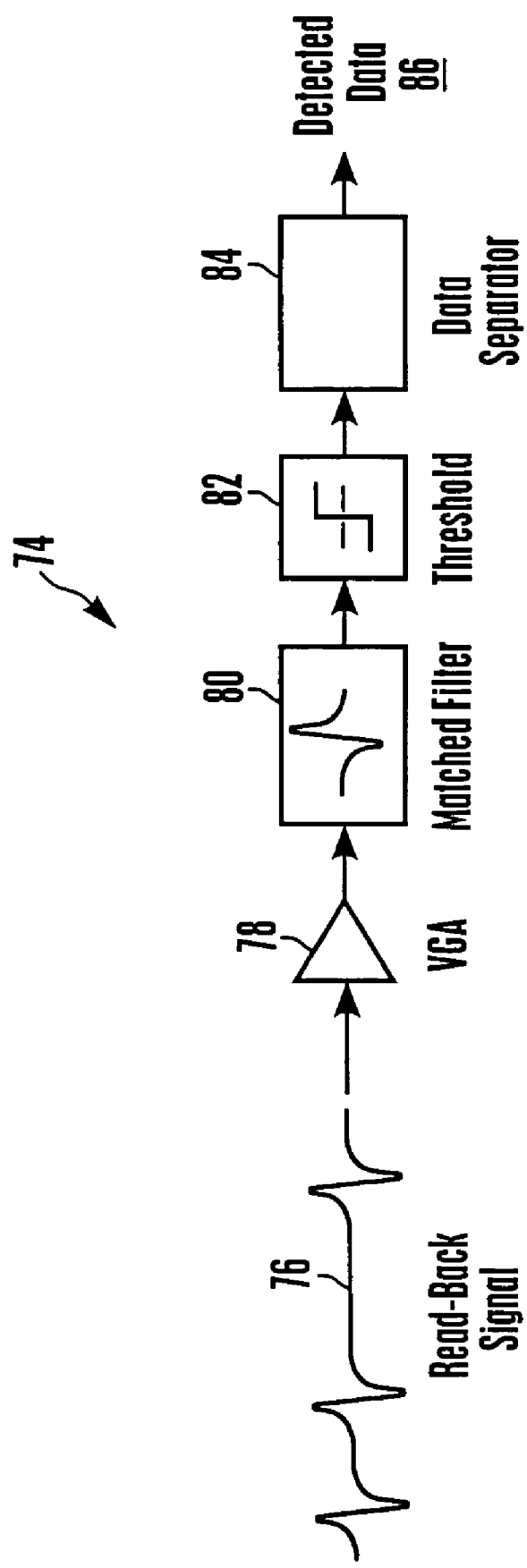
FIG. 12 is a block diagram of an exemplary non-limiting read head channel.

FIG. 12 shows an exemplary read head channel block diagram. As shown, the read back signal 76 is received by a variable gain amplifier (VGA) 78, which may be adjusted as appropriate to account for large amplitude false signals that could otherwise produce a large output from matched filters 80 (only a single matched filter shown) even if the match is poor. The filter 80 is trained similar to how an equalizer is trained for each head and each track zone. For asymmetric triangles the secure data sector is read on track and off track for reasons set forth above, with respective matched filters being used for on track and off track readings and with both filters having to indicate a match for the signal to be processed further.

From the matched filter(s) 80 the signal is sent to a threshold detector 82, which outputs pulses when peaks are detected that are above a threshold. A data separator 84 then separates the binary data and passes an output as detected data 86, for decoding in accordance with the principles of FIG. 10 discussed above.

While the particular SYSTEM AND METHOD FOR WRITING SECURE DATA TO DISK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

Absent express definitions herein, claim terms are to be given all ordinary and accustomed meanings that are not irreconcilable with the present specification and file history.

What is claimed is:

1. A method for writing secure data onto a magnetic recording disk, comprising writing the secure data in a way that renders infeasible at least one of: copying, or altering, the secure data, the secure data being at least one of: a serial number associated with hardware or software, a hash result, an encryption key, and comprising writing triangular-shaped features and substantially erasing approximately one half of the features to establish a binary code representing the secure data.

2. The method of claim 1, wherein the features are symmetric across a data track onto which the features are written.

3. The method of claim 1, wherein the features are asymmetric across a data track onto which the features are written.

4. A method for writing secure data onto a magnetic recording disk, comprising writing the secure data in a way that renders infeasible at least one of: copying, or altering, the secure data, the secure data being at least one of: a serial number associated with hardware or software, a hash result, an encryption key; and, comprising writing secure data transitions that slowly transition from positive to negative, wherein approximately one-half of the transitions are substantially erased to establish a final pattern.

5. A method for writing secure data onto a magnetic recording disk, comprising writing the secure data in a way that renders infeasible at least one of: copying, or altering, the secure data, the secure data being at least one of: a serial number associated with hardware or software, a hash result, an encryption key; and, comprising writing high frequency secure data transitions during servo writing when the disk rotates at a speed less than the speed at which the disk rotates during normal read and write operations, such that when the disk rotates during normal read and write operations, the secure data transitions cannot be duplicated using a write head associated with the disk.

* * * * *